(12) United States Patent
Latrofa et al.

(10) Patent No.: US 10,337,377 B2
(45) Date of Patent: Jul. 2, 2019

(54) METHODS FOR CONTROLLING AND MONITORING OXIDATION CATALYST DEVICES

(71) Applicant: GM GLOBAL TECHNOLOGY OPERATIONS LLC, Detroit, MI (US)

(72) Inventors: Giacomo Latrofa, Turin (IT); Raffaele Esposito, Siano (IT); Giovanni Montinaro, San Pietro Vernotico (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 15/653,781

(22) Filed: Jul. 19, 2017

(65) Prior Publication Data
US 2019/0024557 A1 Jan. 24, 2019

(51) Int. Cl.
*F01N 3/20* (2006.01)
*F01N 11/00* (2006.01)
(Continued)

(52) U.S. Cl.
CPC ............. *F01N 3/208* (2013.01); *F01N 3/035* (2013.01); *F01N 3/2066* (2013.01); *F01N 11/00* (2013.01); *F01N 11/002* (2013.01); *F02D 41/1446* (2013.01); *F01N 3/103* (2013.01); *F01N 2430/06* (2013.01); *F01N 2550/02* (2013.01); *F01N 2560/026* (2013.01); *F01N 2560/14* (2013.01); *F01N 2900/1402* (2013.01); *F01N 2900/1621* (2013.01); *F01N 2900/1622* (2013.01); *F02D 41/0235* (2013.01); *F02D 41/1461* (2013.01); *F02D 41/1463* (2013.01)

(58) Field of Classification Search
CPC .... F01N 3/10; F02D 41/0087; F02D 41/2467; F02D 41/3094; F02D 41/3845; F02D 41/3881; F02D 41/0295; F02D 41/123; F02D 41/126; F02D 2200/0402; F02D 2200/0602; F02D 2200/0814; F02P 9/00
USPC .................. 60/274, 277, 286, 295, 299–301
See application file for complete search history.

(56) References Cited

U.S. PATENT DOCUMENTS

2015/0273395 A1* 10/2015 Catalogna .......... B01D 53/9495
                                                                 423/212
2017/0145893 A1*  5/2017 Kidokoro ........... B01D 46/0036
(Continued)

*Primary Examiner* — Patrick D Maines
*Assistant Examiner* — Dapinder Singh (57) ABSTRACT

Exhaust gas systems includes an oxidation catalyst (OC) capable of receiving exhaust gas and oxidizing one or more of combustable hydrocarbons (HC) and one or more nitrogen oxide (NOx) species, a selective catalytic reduction device (SCR) disposed downstream from and in fluid communication with the OC, an upstream NOx sensor disposed upstream from the SCR, and a downstream NOx sensor disposed downstream from the SCR. Methods for controlling systems include providing exhaust gas to the OC and subsequently the SCR, measuring an upstream exhaust gas NOx concentration, measuring a downstream exhaust gas NOx concentration, determining a NOx differential by subtracting the downstream exhaust gas NOx concentration from the upstream exhaust gas NOx concentration; and comparing the NOx differential to a differential threshold to determine OC catalytic performance. The method is conducted under while OC is above a NOx to NH3 conversion yield threshold, and/or under rich conditions.

20 Claims, 2 Drawing Sheets (51) Int. Cl.
*F02D 41/14* (2006.01)
*F01N 3/035* (2006.01)
*F01N 3/10* (2006.01)
*F02D 41/02* (2006.01)

(56) References Cited

U.S. PATENT DOCUMENTS

2017/0152784 A1\* 6/2017 Kidokoro ........... B01D 46/0027
2018/0023430 A1\* 1/2018 Higashiyama .......... F01N 3/023
                                                                         60/274

\* cited by examiner

METHODS FOR CONTROLLING AND MONITORING OXIDATION CATALYST DEVICES

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons (HC), oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. Another type of exhaust treatment device is an oxidation catalyst (OC) device, which is commonly positioned upstream from a SCR to serve several catalytic functions, including oxidizing HC and CO species. Further, OCs can convert NO into $NO_2$ to alter the $NO:NO_x$ ratio of exhaust gas in order to increase the $NO_x$ reduction efficiency of the downstream SCR. In some applications (e.g., gasoline engines), a three-way catalyst can be utilized to combine $NO_x$ reduction functions and HC and CO oxidation functions into a single exhaust gas treatment device. Ensuring a suitable reduction of $NO_x$ species, particularly via a SCR, over a variety of operating conditions remains a challenge.

SUMMARY

Provided is a method for diagnosing an exhaust gas treatment system, wherein the system can include an oxidation catalyst device (OC) having a catalytic composition (CC) and being capable of receiving exhaust gas and oxidizing one or more of combustable hydrocarbons (HC) and one or more nitrogen oxide (NOx) species, a selective catalytic reduction device (SCR) disposed downstream from and in fluid communication with the OC and configured to store NOx species and reduce NOx species in the presence of a reductant, an upstream NOx sensor disposed upstream from the SCR, and a downstream NOx sensor disposed downstream from the SCR. The method includes providing exhaust gas to the OC and subsequently the SCR, measuring an upstream exhaust gas NOx concentration using the upstream NOx sensor, measuring a downstream exhaust gas NOx concentration using the downstream NOx sensor, determining a NOx differential by subtracting the downstream exhaust gas NOx concentration from the upstream exhaust gas NOx concentration, and comparing the NOx differential to a differential threshold to determine OC performance. A NOx differential above the differential threshold can indicate suitable OC NOx oxidation performance. The SCR reductant loading can be below about 1% and/or the SCR can be below a NOx light-off temperature while exhaust gas is provided to the OC. The exhaust gas provided to the OC can be rich-phase exhaust gas generated by an internal combustion engine. The upstream NOx sensor can be disposed upstream from the OC. The OC can be above an $NH_3$ conversion yield threshold. The CC can be one or more platinum group metals. The SCR can be a selective catalytic reduction filter device. The upstream NOx sensor and the downstream NOx sensor can be each cross-sensitive to NOx and NH3.

Also provided is a method for diagnosing an exhaust gas treatment system, wherein the system can include an oxidation catalyst device (OC) having a catalytic composition (CC) and being capable of receiving exhaust gas and oxidizing one or more of combustable hydrocarbons (HC) and one or more nitrogen oxide (NOx) species, a selective catalytic reduction device (SCR) disposed downstream from and in fluid communication with the OC and configured to store NOx species and reduce NOx species in the presence of a reductant, an upstream NOx sensor disposed upstream from the SCR, and a downstream NOx sensor disposed downstream from the SCR. The method can include providing exhaust gas to the OC, and subsequently to the SCR, for a time frame, measuring an exhaust gas upstream NOx concentration using the upstream NOx sensor during the time frame, measuring a downstream exhaust gas NOx concentration using the downstream NOx sensor during the time frame, subtracting the integral of the downstream exhaust gas NOx concentration over the time frame from the integral of the upstream exhaust gas NOx concentration over the time frame to determine an amount of NH3 created by the OC during the time frame, and comparing the amount of NH3 created to an NH3 threshold to determine OC performance. An NH3 amount above the NH3 threshold indicates suitable OC performance. During the time frame the SCR reductant loading can be sufficiently low such that no appreciable NOx reduction within the SCR occurs, and the OC can beabove a NOx to $NH_3$ conversion yield threshold. The system can further include a particulate filter device (PF) in fluid communication with the OC and the SCR, and the method further can further include conducting a high-temperature PF regeneration prior to the time frame. The exhaust gas provided to the OC can be generated by an internal combustion engine operating at a lambda ratio of less than or equal to 0.97, wherein the lambda ratio is the actual ICE air-fuel ratio divided by the ICE stoichiometric air-fuel ratio. OC performance can be NOx oxidation performance. The NH3 conversion yield threshold can be a temperature above which the NOx to NH3 conversion yield is above about 90%.

Also provided is a method for diagnosing an oxidation catalyst device (OC) of a diesel internal combustion engine (ICE) exhaust gas treatment system, wherein the system includes a diesel ICE configured to receive an air/fuel mixture, combust the air/fuel mixture, and expel the combustion products as exhaust gas via an exhaust gas conduit, an oxidation catalyst device (OC) having a catalytic composition (CC) and being capable of receiving exhaust gas from the ICE via the exhaust gas conduit and oxidizing one or more of combustable hydrocarbons (HC) and one or more nitrogen oxide (NOx) species within the exhaust gas, a selective catalytic reduction device (SCR) disposed downstream from and in fluid communication with the OC and configured to store NOx species and reduce NOx species in the presence of a reductant, an upstream NOx sensor disposed downstream from the OC and upstream from the SCR, and a downstream NOx sensor disposed downstream from the SCR. The method can include providing exhaust gas from the ICE in sequence to the OC and to the SCR for a time frame, wherein the OC is above an $NH_3$ conversion yield threshold and the oxygen content of the exhaust gas is at least 3% lower than the oxygen content of exhaust gas produced by the ICE operating under air-fuel stoichiometric conditions, measuring an upstream exhaust gas NOx concentration for the time frame using the upstream NOx sensor, measuring a downstream exhaust gas NOx concentration for the time frame using the downstream NOx sensor, determining a NOx differential for the time frame by subtracting the downstream exhaust gas NOx concentrations from the upstream exhaust gas NOx concentrations, comparing the NOx differential to a differential threshold to determine OC NOx reduction performance, and correlating the OC NOx reduction performance to OC NOx oxidation performance. The differential threshold can be pre-calibrated, or determined using a data map. During the time frame, the temperature of the OC can be above a NOx to $NH_3$ conversion yield threshold. The SCR reductant loading can be sufficiently low such that no appreciable reduction of NOx occurs within the SCR. The CC can be one or more platinum group metals. The CC can be capable of oxidizing NOx while the ICE operates under stoichiometric and/or lean conditions, and can be capable of reducing NOx to NH3 while the ICE operates under rich conditions. The exhaust gas provided to the OC can be generated by an internal combustion engine operating at a lambda ratio of about 0.91 to about 0.98, wherein the lambda ratio is the actual ICE air-fuel ratio divided by the ICE stoichiometric air-fuel ratio. The ICE can power a vehicle.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to methods for monitoring and the catalytic performance of oxidation catalyst devices (OC), which correlate the reductive activity of OCs to an oxidizing, capability of the same. Over time, the catalytic activity of an OC can decline, due to catalyst poisoning and other factors. Specifically, the methods monitor the capability of an OC to reduce NOx to NH3 under certain conditions, and correlate the reductive activity to the capability of the OC to oxidize NOx species under different conditions. As used herein, "$NO_x$," refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$. The methods disclosed herein are particularly suitable for use with internal combustion engine (ICE) exhaust gas treatment systems, although other applications are also foreseen. Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

Figure 1:
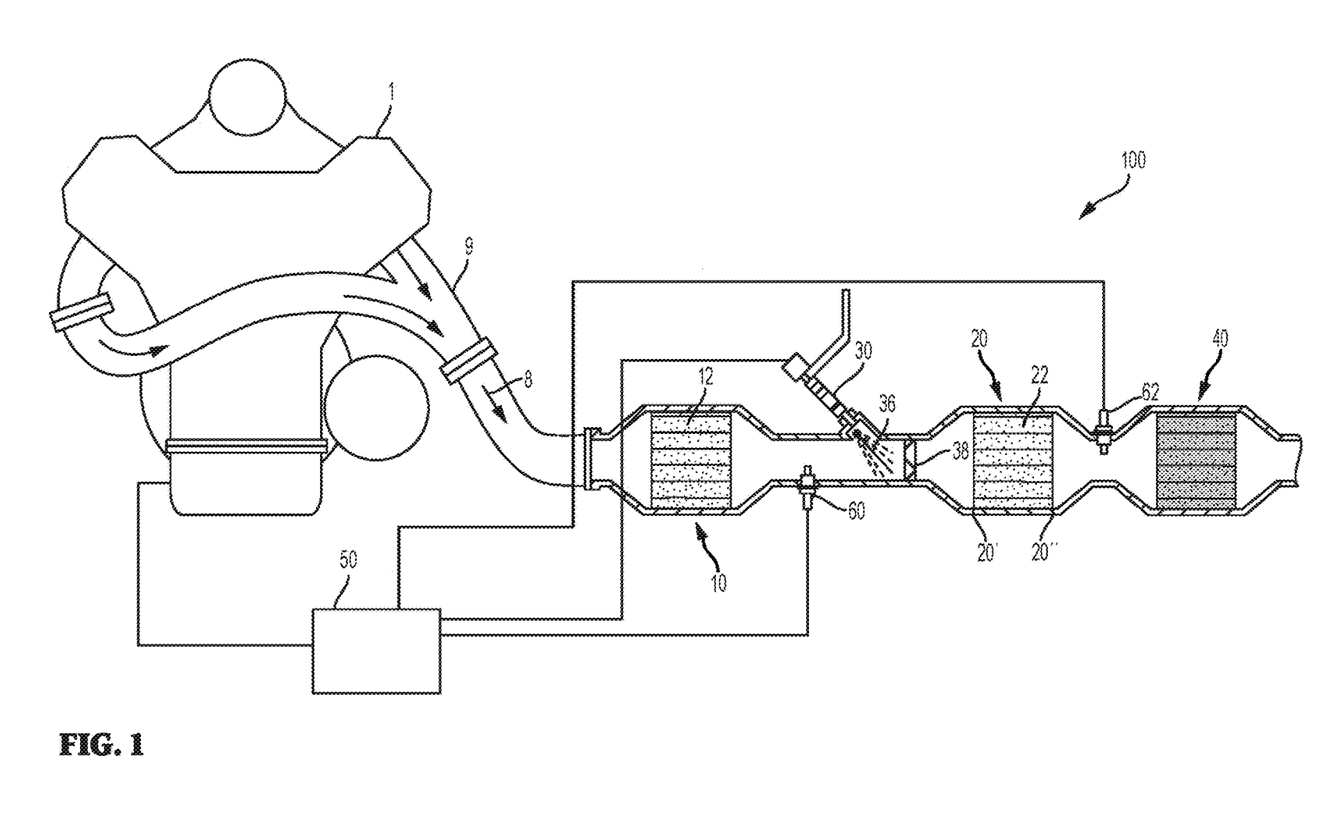
FIG. 1 illustrates an schematic view of an exhaust gas treatment system, according to one or more embodiments.

FIG. 1 illustrates an exhaust gas treatment system 100 utilizing one or more OCs for treating and/or monitoring gas species, such as species of exhaust gas 8 generated by an ICE 1. System 100 generally includes one or more exhaust gas conduits 9, and one or more downstream exhaust treatment devices. Upstream and downstream are defined in relation to the direction of the flow of exhaust gas 8 from ICE 1. As used herein, a plurality of elements described as being upstream and/or downstream from each other are necessarily in fluid communication with each other. The exhaust gas conduit 9, which can comprise several segments, transports exhaust gas 8 from the ICE 1 to the various exhaust treatment devices of the exhaust gas treatment system 100. ICE 1 is included in system 100 for the purposes of illustration only, and the disclosure herein is not to be limited to gas sources provided by ICEs. It should be further understood that the embodiments disclosed herein may be applicable to treatment of any exhaust streams including NOx, carbon monoxide (CO), HC, or other chemical species which are desirably combusted or otherwise oxidized by OCs.

ICE 1 can include one or more cylinders (not shown) capable of each accepting a piston (not shown) which can reciprocate therein. Air and fuel are combusted in the one or more cylinders thereby reciprocating the appurtenant pistons therein. The pistons can be attached to a crankshaft (not shown) operably attached to a vehicle driveline (not shown) in order to deliver tractive torque thereto, for example. Exhaust gas 8 can generally include: CO, HC, water, and oxides of nitrogen ($NO_x$). Constituents of exhaust gas, as used herein, are not limited to gaseous species. HC refers to combustable chemical species comprising hydrogen and carbon, and generally includes one or more chemical species of gasoline, diesel fuel, or the like. Exhaust gas 8 is expelled from ICE 1 and sequentially communicated to OC 10, and selective catalytic reduction device (SCR) 20. A reductant injector 30 is configured to inject reductant 36 into exhaust gas conduit 9 downstream from OC 10 and upstream from SCR 20. System 100 can optionally include a particulate filter device (PF) 40, for example disposed downstream from SCR 20 as shown. Exhaust gas 8 is can be expelled from system 100 via a vehicle tailpipe, for example.

System 100 can further include a control module 50 operably connected via a number of sensors to monitor ICE 1 and/or the exhaust gas treatment system 100. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 1, OC 10, SCR 20, PF 40, and/or one or more sensors. As shown, control module 50 is in communication with an upstream $NO_x$ sensor 60, disposed upstream from SCR 20, and a downstream $NO_x$ sensor 62, disposed downstream of SCR 20. Upstream NOx sensor 60 and downstream NOx sensor 62 can be in fluid communication with exhaust gas conduit 9 in order to extract exhaust gas 8 samples, for example. Upstream NOx sensor 60 can optionally be disposed upstream from OC. Upstream $NO_x$ sensor 60 and downstream $NO_x$ sensor 62 are configured to detect a $NO_x$ level proximate their location within exhaust gas conduit 9, and generate a NOx signal which corresponds to the NOx level. A NOx level can comprise a concentration, a mass flow rate, or a volumetric flow rate, in some embodiments. A NOx signal generated by a NOx sensor can be interpreted by control module 50, for example. A shortcoming of NOx sensors 60 and 62 is a cross-sensitivity to NOx and NH3, wherein a sensor signal generated by a NOx species is indistinguishable from a signal generated by an NH3 species.

In general, the SCR 20 includes all devices which are capable of storing and utilizing a reductant 36 and a catalyst to reduce NOx species to desired chemical species, including diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$) which is capable of decomposing into $NH_3$. Additionally or alternatively, reductant 36 can be any compound capable of decomposing or reacting in the presence of exhaust gas 8 and/or heat to form ammonia. The reductant 36 can be diluted with water in various implementations. In implementations where the reductant 36 is diluted with water, heat (e.g., from the exhaust) evaporates the water, and ammonia is supplied to the SCR 20. Non-ammonia reductants can be used as a full or partial alternative to ammonia as desired. In implementations where the reductant 36 includes urea, the urea reacts with the exhaust to produce ammonia, and ammonia is supplied to the SCR 20. Equation (1) below provides an exemplary chemical reaction of ammonia production via urea decomposition.

$$CO(NH_2)_2 + H_2O \rightarrow 2NH_3 + CO_2 \qquad (1)$$

It should be appreciated that Equation (1) is merely illustrative, and is not meant to confine the urea or other reductant 36 decomposition to a particular single mechanism, nor preclude the operation of other mechanisms. Efficient decomposition urea to $NH_3$ typically requires temperatures in excess of about 200° C., and, depending on the amount of urea injected, for example relative to a flow rate of exhaust gas 8, urea can crystalize in temperatures less than about 200° C. Accordingly, reductant 36 injection events and/or dosing quantities are typically determined based upon system temperature and exhaust gas 8 flow rate, among others, such that urea decomposition yield is maximized and urea crystallization is minimized.

Equations (2)-(6) provide exemplary chemical reactions for $NO_x$ reduction involving ammonia.

$$6NO + 4NH_3 \rightarrow 5N_2 + 6H_2O \qquad (2)$$

$$4NO + 4NH_3 + O_2 \rightarrow 4N_2 + 6H_2O \qquad (3)$$

$$6NO_2 + 8NH_3 \rightarrow 7N_2 + 12H_2O \qquad (4)$$

$$2NO_2 + 4NH_3 + O_2 \rightarrow 3N_2 + 6H_2O \qquad (5)$$

$$NO + NO_2 + 2NH_3 \rightarrow 2N_2 + 3H_2O \qquad (6)$$

It should be appreciated that Equations (2)-(6) are merely illustrative, and are not meant to confine SCR 20 to a particular $NO_x$ reduction mechanism or mechanisms, nor preclude the operation of other mechanisms. SCR 20 can be configured to perform any one of the above $NO_x$ reduction reactions, combinations of the above $NO_x$ reduction reactions, and other $NO_x$ reduction reactions.

As shown in FIG. 1, SCR 20 includes a catalytic composition (CC) 22 packaged in a shell or canister generally defining an upstream side 20' (i.e., inlet) and a downstream side 20" (i.e., outlet) and disposed in fluid communication with exhaust gas conduit 9 and optionally other exhaust treatment devices (e.g., OC 10). The shell or canister can comprise a substantially inert material, relative to the exhaust gas constituents, such as stainless steel. SCR 20 is configured to receive exhaust gas 8 and reductant 36 at upstream side 20'. Reductant 36 can be supplied from a reductant reservoir (not shown) and injected into the exhaust gas conduit 9 at a location upstream from SCR 20 via an injector 30, or other suitable delivery means. Reductant 36 can be in the form of a gas, a liquid, or an aqueous solution, such as an aqueous urea solution. Reductant 36 can be mixed with air in the injector 30 to aid in the dispersion of the injected spray. A turbulator 38 (i.e., mixer) can also be disposed within the exhaust conduit 9 in close proximity to the injector 30 and/or the SCR 20 to further assist in thorough mixing of reductant 36 with the exhaust gas 8 and/or even distribution throughout the SCR 20, and particularly throughout CC 22. Turbulator 38 can comprise a fixed or movable body configured to mix, vaporize, and/or otherwise contact reductant 36 within conduit 9. For example, turbulator 38 can comprise a rotating body including one or a plurality of vanes. Turbulator 38 can comprise a metal or electrically conductive material.

CC 22 can be a porous and high surface area material which can operate efficiently to convert $NO_x$ constituents in the exhaust gas 8 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable CCs 22 can have high thermal structural stability, particularly when used in tandem with PFs or when incorporated into selective catalytic reduction filter devices (SCRF), which are regenerated via high temperature exhaust soot burning techniques. CC 22 can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

SCR 20 can have a light-off temperature above which CC 22 exhibits desired or suitable catalytic activity or yield (e.g., reduction of NOx species). The light-off temperature can be dependent upon the type of catalytic materials of which CC 22 is comprised, and the amount of catalytic materials present in SCR 20, among other factors. For example, a CC 22 comprising $V_2O_5$ can have a light off temperature of about 300° C. In another example, a CC 22 comprising Fe-impregnated zeolite can have a light off temperature of about 350° C. In another example, a CC 22 comprising Cu-impregnated zeolite can have a light off temperature of about 150° C. When SCR 20 operates at a temperature below its light-off temperature, undesired $NO_x$ breakthrough and $NH_3$ slip can occur wherein $NO_x$ and/or $NH_3$ pass through SCR 20 unreacted or unstored. $NO_x$ breakthrough and $NH_3$ slip can be particularly problematic immediately after engine startup and in cold conditions. $NO_x$ breakthrough can also be exacerbated by lean burn strategies commonly implemented in diesel engines, for example. Lean burn strategies coordinate combustion at higher than stoichiometric air to fuel mass ratios to improve fuel economy, and produce hot exhaust with a relatively high content of O2 and $NO_x$ species. The high O2 content can further inhibit or prevent the reduction of $NO_x$ species in some scenarios.

CC 22 can be disposed on a substrate body, such as a metal or ceramic brick, plate, or monolithic honeycomb structure. CC 22 can be deposited on the substrate body as a washcoat, for example. A monolithic honeycomb structure can include several hundred to several thousand parallel flow-through cells per square inch, although other configurations are suitable. Each of the flow-through cells can be defined by a wall surface on which CC 22 can be washcoated. The substrate body can be formed from a material capable of withstanding the temperatures and chemical environment associated with the exhaust gas 8. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can comprise, be contiguous with, or be proximate heater 40, as will be described below. One example of an exhaust gas treatment device is a SCRF which provide the catalytic aspects of SCRs in addition to particulate filtering capabilities. Generally, an SCRF comprises CC 22 applied to a filter substrate, such as a ceramic or SiC wall flow monolith filter, wound or packed fiber filters, open cell foams, sintered metal fibers, etc. In some embodiments, the SCRF filter substrate can comprise, be contiguous with, or be proximate heater 40, as will be described below.

The SCR 20 can store (i.e., absorb, and/or adsorb) reductant for interaction with exhaust gas 8. For example, the reductant can be stored within the SCR as ammonia. During operation of SCR 20, injected reductant 36 can be stored in SCR 20 and subsequently consumed during reduction reactions with NOx species. A given SCR has a reductant capacity, or an amount of reductant or reductant derivative it is capable of storing. The amount of reductant stored within a SCR relative to the SCR capacity can be referred to as the SCR "reductant loading", and can be indicated as a % loading (e.g., 90% reductant loading) in some instances.

System 100 includes PF 40, disposed downstream from SCR 20. For example only, PF 40 can include a diesel particulate filter (DPF). PF 40 operates to filter the exhaust gas 8 of carbon, soot, and other particulates. PF 40 generally includes a filter, such as a ceramic or SiC wall flow monolith filter, packaged in a shell or canister. The canister can be constructed of, for example, stainless steel, and have an inlet and an outlet in fluid communication with exhaust gas conduit 9. In some embodiments, exhaust treatment System 100 can further include a selective catalytic reduction filter device (SCRF). In some embodiments, exhaust treatment System 100 can include a SCRF as an alternative to a SCR 20 and PF 40. SCRFs generally provide the catalytic aspects of SCRs in addition to particulate filtering capabilities of PFs. For example, a SCRF can include a filter carrier or substrate that is dipped into a washcoat containing a SCR catalytic component. Over time, PFs and SCRFs can build up particulate matter and must be regenerated by high-temperature burning. PFs can be regenerated using post-injection strategies, for example. A post-injection strategy is a modification of a normal ICE injection strategy, by adding or replacing a fuel injection event. During the operation of an ICE, such as ICE 1, fuel and air are injected into a cylinder and combusted, reciprocating a piston within the cylinder which subsequently translates mechanic work to an associated crankshaft. During or subsequent to movement of the piston via the combustion event, the combustion products are expelled from the cylinder as exhaust. A post-injection strategy comprises injecting or otherwise delivering fuel into an engine cylinder after the first air-fuel mixture has been delivered or created within the cylinder, but such that the post-injected fuel is substantially or completely combusted within the cylinder. Alternatively, in some instances, the post-injected fuel is only partially combusted and the exhaust gas comprises a higher amount of unburned fuel (e.g., HC). By introducing additional fuel into the cylinder, post-injection accordingly imparts additional heat to the exhaust gas expelled from the cylinder which subsequently can aid in regenerating a PF. A post-injection strategy can be referred to as a "rich-mode", in which the ICE 1 receives air/fuel mixtures that are more fuel-rich than the stoichiometric combustion ratio. While operating in a rich mode, ICE 1 can emit exhaust gas streams with increased HC content and reduced oxygen content relative to air-fuel stoichiometric ICE operating modes. A post-injection strategy can further include reducing the amount of air provided to one or more ICE cylinders, in order to increase the magnitude of the rich-mode. Often, a rich-mode can require both a post-injection strategy in combination with reduced air delivery to one or more ICE cylinders.

OC 10 is a flow-through device comprising a catalytic composition (CC) 12 and configured to accept exhaust gas 8. OC 10 is generally utilized to oxidize various exhaust gas 8 species, including HC, CO, and $NO_x$ species. CC 12 can be housed within a housing, such as a metal housing, having an inlet (i.e., upstream) opening and outlet (i.e., downstream) opening, or be otherwise configured to provide structural support and facilitate fluid (e.g., exhaust gas) flow through OC 10. The housing can ideally comprise a substantially inert material, relative to the exhaust gas constituents, such as stainless steel, and may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC 10 to exhaust gas conduit 9 and/or another component of the exhaust gas treatment system 100, it should be appreciated that OC 10, including the housing, can include one or more additional components for facilitating in operation of the OC 10, or exhaust gas treatment system 100, including, but not limited to, various sensors.

CC 12 can comprise many various catalytically active materials and physical configurations thereof, and can optionally comprise a substrate such as a porous ceramic matrix or the like. Catalytically active materials can comprise platinum group metal catalysts, metal oxide catalysts, and combinations thereof. Suitable platinum group metals can include Pt, Pd, Rh, Ru, Os or Ir, or combinations thereof, including alloys thereof. In one embodiment, suitable metals include Pt, Pd, Rh, and combinations thereof, including alloys thereof. Suitable metal oxide catalyst can include iron oxides, zinc oxides, aluminum oxides, perovksites, and combination thereof, for example. In one embodiment, CC 12 can comprise Pt and $Al_2O_3$. In many embodiments, CC 12 comprises zeolite impregnated with one or more catalytically active base metal components. The zeolite can comprise a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. It is to be understood that the CC 12 is not limited to the particular examples provided, and can include any catalytically active device capable of oxidizing HC and CO species, reducing NOx species, and optionally oxidizing NOx species. In particular, a CC utilized in a diesel oxidation catalyst can oxidize HC, CO, and NOx species under particular conditions, and reduce NOx under other conditions. In another example, a three-way catalyst, such as one utilized in combination with a gasoline ICE, can oxidize HC and CO, and reduce NOx under certain conditions.

OC 10 can store and/or oxidize $NO_x$ species in exhaust gas 8, which, for example, may form during the combustion of fuel. For example, in some embodiments, OC 10 can be utilized to convert NO into $NO_2$ in order to optimize the exhaust gas $NO:NO_2$ ratio for downstream SCRs and/or SCRFs which generally operate more efficiently with exhaust gas feed streams having a $NO:NO_2$ ratio of about 1:1. Accordingly, in many embodiments, OC 10 is disposed upstream from optional SCRs and SCRF devices. OC 10 can have a light-off temperature above which CC 12 exhibits desired or suitable catalytic activity relating to the oxidation of NOx species. An OC 10 NOx oxidation light-off temperature can also correspond to the temperature at which NOx species stored by CC 12 are released. The light-off temperature can be dependent upon the type of catalytic materials of which CC 12 is comprised, and the amount of catalytic materials present in OC 10, among other factors. Generally, CC 12 can have a NOx oxidation light off temperature of about 150° C. to about 200° C. For example, some CCs 12 achieve 50% conversion of NOx species at about 230° C. When OC 10 operates at a temperature below its NOx oxidation light-off temperature, the $NO_2:NOx$ ratio of exhaust gas 8 communicated from OC 10 to a downstream SCR 20 is not optimized.

OC 10 can additionally or alternatively store HC and/or catalyze the oxidation (e.g., combustion) of HC and CO species in exhaust gas. Combustion generally involves the oxidation of HC and/or CO species in the presence of oxygen to generate heat, water, and $CO_2$. In some instances, HC and/or CO may be present in exhaust gas 8 as a consequence of undesired incomplete combustion of fuel, for example. In other instances, HC may be present in exhaust gas 8 in order to implement various ICE 1 and/or system 100 control strategies. For example, OC 10 can be utilized to exothermically oxidize HC to aid one or more exhaust gas treatment devices of system 100 achieve light-off temperatures. OC 10 can additionally or alternatively be utilized to oxidize HC for after-injection and auxiliary-injection regeneration strategies. After-injection strategies, such as those used for regeneration of PFs and/or catalysts, manipulate engine calibrations such that fuel after-injected into the engine cylinders is expelled into the exhaust system 100 at least partially uncombusted. When the after-injected fuel contacts OC 10, heat released during oxidation of the fuel is imparted to the exhaust gas treatment system and can aid in regenerating various treatment devices, such as particular filter PFs and SCRFs, for example. Similarly, auxiliary-injection strategies, such as those used for regeneration of PFs and/or catalysts, inject fuel into system 100 downstream from ICE 1 in order to contact the fuel with OC 10 whereafter heat is released from the exothermic combustion of fuel.

OC 10 can have a light-off temperature above which CC 12 exhibits desired or suitable catalytic activity relating to the oxidation of CO and/or HC species. An OC 10 CO and/or HC light-off temperature can also correspond to the temperature at which CO and/or HC species stored by CC 12 are released. The light-off temperature can be dependent upon the type of catalytic materials of which CC 12 is comprised, and the amount of catalytic materials present in OC 10, among other factors. For example, some CCs 12 can have a CO oxidation light off temperature of about 150° C. to about 175° C. For example, some CCs 12 can have a HC oxidation light off temperature of about 175° C. to about 250° C. When OC 10 operates at a temperature below its CO and/or HC oxidation light-off temperature, undesired CO and/or HC breakthrough can occur.

Methods for diagnosing the catalytic performance of OCs are limited both in their opportunistic availability and accuracy. Provided herein are methods for monitoring the catalytic performance of an OC which leverage the cross-sensitivity of NOx sensors and the phenomenon wherein OC 10 catalytically converts NOx to $NH_3$ at certain conditions. In particular, under rich conditions and at high temperatures (e.g., greater than about 350° C.), the oxidation catalyst materials (e.g., CC 12) can reduce NOx species to $NH_3$. The reduction of NOx species to NH3 by OC 10 can be correlated to OC 10 NOx oxidation capabilities, which can be utilized to monitor OC 10 performance, for example. The reduction of NOx species to NH3 and the oxidation of NOx species can be catalyzed by the same catalytic elements (i.e., CC 12), which can include PGM in some embodiments.

Figure 2:
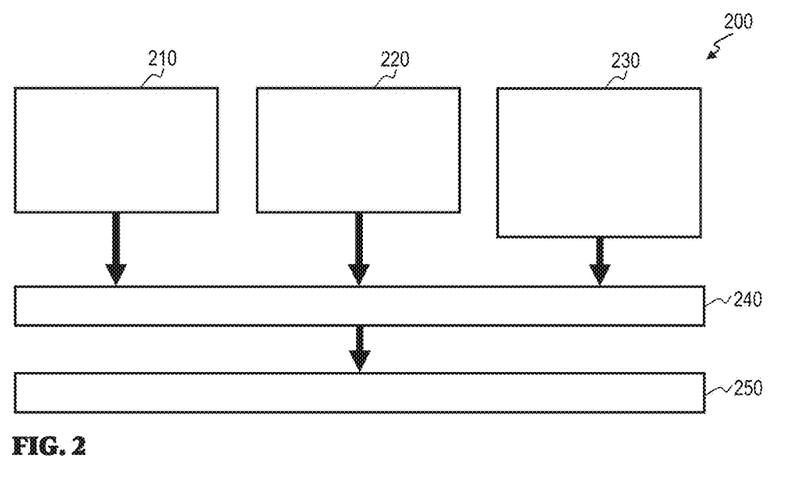
FIG. 2 illustrates a flow chart of a method for monitoring and/or diagnosing an exhaust gas treatment system, according to one or more embodiments.

FIG. 2 illustrates a method 200 for diagnosing an exhaust gas treatment system. Method 200 will be described in reference to system 100, but are not to be construed as limited by the particular configuration of System 100 as described. Method 200 comprises providing 210 exhaust gas 8 to OC 10 and subsequently to SCR 20, measuring 220

NOx concentration upstream from SCR 20 (e.g., via upstream NOx sensor 60), measuring 230 NOx concentration downstream from SCR 20 (e.g., via downstream NOx sensor 62), determining 240 an upstream-downstream NOx differential, and determining 250 OC 20 performance using the NOx differential. The upstream NOx concentration and downstream NOx concentration can comprise an average concentration over a time frame, for example. Upstream NOx sensor 60 and downstream NOx sensor 62 are cross-sensitive to NOx and $NH_3$. Exhaust gas 8 can be provided 210 to OC 10 and subsequently to SCR 20 by ICE 1, and ICE 1 can optionally power a vehicle. Providing 210, measuring 220, and measuring 230 can occur during a time frame, for example. OC 10 comprises CC 12 which is capable of oxidizing NOx while OC 10 is below a NOx to $NH_3$ conversion yield threshold (e.g., ICE 1 operates at stoichiometric and/or lean conditions), as will be described below, and is capable of reducing NOx to NH3 while OC 10 is above a NOx to $NH_3$ conversion yield threshold (e.g., ICE 1 operates at rich conditions).

During implementation of method 200 (e.g., during the time frame), the OC can be above a NOx to $NH_3$ conversion yield threshold. The NOx to $NH_3$ conversion yield threshold is generally a function of one or more of OC 10 temperature, the oxygen content of exhaust gas 8 provided to OC 10, and the amount of CC 12 (e.g., the OC 10 PGM loading), wherein higher OC 10 temperatures, lower oxygen content of exhaust gas 8, and higher catalytic loading of CC 12 increase NOx to $NH_3$ conversion yields. OC 10 temperature and oxygen content of exhaust gas 8 can be determined for a particular OC 10 (e.g., having a particular PGM loading) such that a desired amount of NOx is reduced to $NH_3$ via CC 12. A suitable NOx reduction yield can be at least about 90%, at least about 95%, or about 99%, for example. In other embodiments, a suitable NOx reduction yield can comprise any yield which is measurable, or can be accounted for by a model, for example.

A suitable DOC temperature can be at least about 350° C., for example. A desired oxygen content of exhaust gas 8 can be lower than the oxygen content of exhaust gas 8 produced by ICE operating under stoichiometric conditions, for example. During implementation of method 200, exhaust gas 8 can optionally comprise an increased level of HC relative to the HC level of exhaust gas 8 produced by ICE 1 operating under stoichiometric conditions. During implementation of method 200, ICE 1 can operate in a rich mode and produce rich-phase exhaust gas 8. Particular stoichiometric air-fuel ratios can vary, depending on the composition of atmospheric air and/or the composition of fuel, for example. An ICE rich operating mode or rich exhaust gas can be uniformly defined by a lambda ratio ($\lambda$) which is calculated by the actual air-fuel ratio divided by the stoichiometric air-fuel ratio. Accordingly, at stoichiometric conditions $\lambda=1$, at lean conditions $\lambda>1$, and at rich conditions $\lambda<1$. In one embodiment, the exhaust gas 8 provided to OC 10 is generated by ICE 1 operating at a lambda ratio of less than or equal to 0.97 (i.e., at least 3% lower than the oxygen content of exhaust gas 8 produced by ICE 1 operating under air-fuel stoichiometric conditions). In some embodiments, the exhaust gas 8 provided to OC 10 is generated by ICE 1 operating at a lambda ratio about 0.91 to about 0.98.

In some embodiments, the SCR 20 can have a reductant 36 loading below about 1%, and/or SCR 20 can be below its NOx light-off temperature. In other embodiments, the SCR 20 can have a reductant 36 loading which is sufficiently low such that no appreciable NOx reduction within the SCR occurs, and/or SCR 20 can be below its NOx light-off temperature. In some embodiments, method 200 optionally comprises first conducting a PF 40 high-temperature regeneration prior to providing 210, measuring 220, and measuring 230. The PF 40 regeneration can ensure a high OC 10 temperature and low SCR 20 reductant 36 loading.

Under the conditions described above, OC 10 will reduce at least a portion of NOx present in exhaust gas 8 to $NH_3$, and exhaust 8 gas downstream from OC 10 will comprise $NH_3$ and optionally NOx, wherein the NOx represents an amount or concentration of NOx in exhaust gas 8 which was not reduced to $NH_3$. When exhaust gas 8 subsequently enters SCR 20, the $NH_3$ will be stored in CC 22. Low SCR 20 reductant 36 loading will allow any NOx in exhaust gas 8 to pass through SCR 20 unreduced and subsequently be detected by downstream NOx sensor 62. Based upon the expected NOx to $NH_3$ yield of OC 10 under the particular conditions of system 100, the amount or concentration of NOx in exhaust gas 8 exiting OC 10 can exhibit a deficiency in OC 10 catalytic (i.e., reducing) capability. This amount of NOx is equal to the NOx differential, which can be determined 240 by subtracting the downstream NOx concentration from the upstream NOx concentration. Similarly, in one embodiment, the NOx differential can comprise an amount of $NH_3$ calculated by subtracting the integral of the downstream exhaust gas NOx concentration over a time frame from the integral of the upstream exhaust gas NOx concentration over the time frame to determine an amount of NH3 created by the OC during the time frame.

A differential threshold (i.e., an acceptable maximum amount of NOx present in exhaust gas 8 downstream from OC 10, or an acceptable minimum amount of $NH_3$ produced by OC 10) can be determined to identify a minimum level of acceptable reducing capability of OC 10, and can be unique to various operating parameters of system 100 (i.e., OC 10 temperature, exhaust gas 8 oxygen concentration, etc.) For example, under particular operating conditions of system 100, a model may determine the NOx to $NH_3$ conversion yield (e.g., 5%, 50%, 90%, 99.999%) for CC 12. This conversion yield can be used to determine the differential threshold. The differential threshold can be pre-calibrated, or determined using a data map comprising a plurality of values which correspond to one or more aspects of system 100, such as ICE calibration, exhaust gas 8 $NO_x$ concentration, exhaust gas 8 HC concentration, and CC 12 temperature, among others, for example. Similarly, the differential threshold can be specific to a particular OC 10. For example, a higher amount of CC 12 (e.g., PGM) will increase $NH_3$ formation and accordingly the threshold should be set higher. Similarly, a CC 12 comprising Pt will form more NH3 than a CC3 comprising Pt, Pd, and Rh, and accordingly should have a higher threshold.

Comparing the NOx differential to the differential threshold can indicate the suitability of OC 10 catalytic (i.e., reducing) performance. For example, a NOx differential which is greater than the differential threshold can indicate unsuitable OC 10 catalytic reduction performance. More importantly, the suitability of the OC 10 reducing performance can be correlated to the suitability of the OC 10 oxidizing performance. Therefore, in determining the catalytic capability of OC 10 to reduce NOx to $NH_3$, the catalytic capability of OC 10 to oxidize one or more of NOx, HC, and CO, among others, can be determined. More specifically, the catalytic capability of OC 10 to reduce NOx to $NH_3$ at or above a NOx to $NH_3$ conversion yield threshold (e.g., at rich conditions) can be correlated to the catalytic capability of OC 10 to oxidize one or more of $NO_x$, HC, and CO, among others, below the $NO_x$ to $NH_3$ conversion yield threshold (e.g., at stoichiometric or lean conditions).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for diagnosing an exhaust gas treatment system, wherein the system comprises an oxidation catalyst device (OC) including a first metal and/or metal oxide catalytic composition (CC) disposed in a housing having an inlet and an outlet and capable of receiving exhaust gas and oxidizing combustable hydrocarbons (HC) and/or nitrogen oxide (NOx) species, a selective catalytic reduction device (SCR) disposed downstream from and in fluid communication with the OC and including a second base metal or base metal oxide catalytic composition disposed in a shell having an inlet and an outlet and configured to store NOx species and reduce NOx species in the presence of a reductant, an upstream NOx sensor disposed upstream from the SCR, and a downstream NOx sensor disposed downstream from the SCR, the method comprising:
    providing exhaust gas to the OC and subsequently the SCR;
    measuring an upstream exhaust gas NOx concentration using the upstream NOx sensor;
    measuring a downstream exhaust gas NOx concentration using the downstream NOx sensor;
    determining a NOx differential by subtracting the downstream exhaust gas NOx concentration from the upstream exhaust gas NOx concentration; and
    comparing the NOx differential to a differential threshold to determine OC performance, wherein a NOx differential above the differential threshold indicates suitable OC NOx oxidation performance;
wherein the SCR reductant loading is below about 1% and/or the SCR is below a NOx light-off temperature while exhaust gas is provided to the OC.

2. The method of claim 1, wherein the exhaust gas provided to the OC comprises rich-phase exhaust gas generated by an internal combustion engine.

3. The method of claim 1, wherein the upstream NOx sensor is disposed upstream from the OC.

4. The method of claim 1, wherein the OC is above an $NH_3$ conversion yield threshold.

5. The method of claim 1, wherein the CC comprises one or more platinum group metals.

6. The method of claim 1, wherein the SCR comprises a selective catalytic reduction filter device.

7. The method of claim 1, wherein the upstream NOx sensor and the downstream NOx sensor are each cross-sensitive to NOx and NH3.

8. A method for diagnosing an exhaust gas treatment system, wherein the system comprises an oxidation catalyst device (OC) including a first metal and/or metal oxide catalytic composition (CC) disposed in a housing having an inlet and an outlet and capable of receiving exhaust gas and oxidizing one or more of combustable hydrocarbons (HC) and one or more nitrogen oxide (NOx) species, a selective catalytic reduction device (SCR) disposed downstream from and in fluid communication with the OC and including a second base metal or base metal oxide catalytic composition disposed in a shell having an inlet and an outlet and configured to store NOx species and reduce NOx species in the presence of a reductant, an upstream NOx sensor disposed upstream from the SCR, and a downstream NOx sensor disposed downstream from the SCR, the method comprising:
    providing exhaust gas to the OC, and subsequently to the SCR, for a time frame;
    measuring an exhaust gas upstream NOx concentration using the upstream NOx sensor during the time frame;
    measuring a downstream exhaust gas NOx concentration using the downstream NOx sensor during the time frame;
    subtracting the integral of the downstream exhaust gas NOx concentration over the time frame from the integral of the upstream exhaust gas NOx concentration over the time frame to determine an amount of NH3 created by the OC during the time frame; and
    comparing the amount of NH3 created to an NH3 threshold to determine OC performance, wherein an NH3 amount above the NH3 threshold indicates suitable OC performance;
wherein during the time frame the SCR reductant loading is sufficiently low such that no appreciable NOx reduction within the SCR occurs, and the OC is above a NOx to NH3 conversion yield threshold.

9. The method of claim 8, wherein the system further comprises a particulate filter device (PF) in fluid communication with the OC and the SCR, and the method further comprises conducting a high-temperature PF regeneration prior to the time frame.

10. The method of claim 8, wherein the exhaust gas provided to the OC is generated by an internal combustion engine operating at a lambda ratio of less than or equal to 0.97, wherein the lambda ratio comprises the actual ICE air-fuel ratio divided by the ICE stoichiometric air-fuel ratio.

11. The method of claim 8, wherein OC performance comprises NOx oxidation performance.

12. The method of claim 8, wherein the NH3 conversion yield threshold comprises a temperature above which the NOx to NH3 conversion yield is above about 90%.

13. Method for diagnosing an oxidation catalyst device (OC) of a diesel internal combustion engine (ICE) exhaust gas treatment system, wherein the system comprises a diesel ICE configured to receive an air/fuel mixture, combust the air/fuel mixture, and expel the combustion products as exhaust gas via an exhaust gas conduit, an oxidation catalyst device (OC) including a first metal and/or metal oxide catalytic composition (CC) disposed in a housing having an inlet and an outlet and capable of receiving exhaust gas from the ICE via the exhaust gas conduit and oxidizing one or more of combustable hydrocarbons (HC) and one or more nitrogen oxide (NOx) species within the exhaust gas, a selective catalytic reduction device (SCR) disposed downstream from and in fluid communication with the OC and including a second base metal or base metal oxide catalytic composition disposed in a shell having an inlet and an outlet and configured to store NOx species and reduce NOx species in the presence of a reductant, an upstream NOx sensor disposed downstream from the OC and upstream from the SCR, and a downstream NOx sensor disposed downstream from the SCR, the method comprising:

provide exhaust gas from the ICE in sequence to the OC and to the SCR for a time frame, wherein the OC is above an NH3 conversion yield threshold and the oxygen content of the exhaust gas is at least 3% lower than the oxygen content of exhaust gas produced by the ICE operating under air-fuel stoichiometric conditions;

measuring an upstream exhaust gas NOx concentration for the time frame using the upstream NOx sensor;

measuring a downstream exhaust gas NOx concentration for the time frame using the downstream NOx sensor;

determining a NOx differential for the time frame by subtracting the downstream exhaust gas NOx concentrations from the upstream exhaust gas NOx concentrations;

comparing the NOx differential to a differential threshold to determine OC NOx reduction performance; and correlating the OC NOx reduction performance to OC NOx oxidation performance.

14. The method of claim 13, wherein the differential threshold is pre-calibrated, or determined using a data map.

15. The method of claim 13, wherein during the time frame, the temperature of the OC is above a NOx to NH3 conversion yield threshold.

16. The method of claim 13, the SCR reductant loading is sufficiently low such that no appreciable reduction of NOx occurs within the SCR.

17. The method of claim 13, wherein the CC comprises one or more platinum group metals.

18. The method of claim 13, wherein the CC is capable of oxidizing NOx while the ICE operates under stoichiometric and/or lean conditions, and is capable of reducing NOx to NH3 while the ICE operates under rich conditions.

19. The method of claim 13, wherein the exhaust gas provided to the OC is generated by an internal combustion engine operating at a lambda ratio of about 0.91 to about 0.98, wherein the lambda ratio comprises the actual ICE air-fuel ratio divided by the ICE stoichiometric air-fuel ratio.

20. The method of claim 13, wherein the ICE powers a vehicle.

* * * * *